June 3, 1941.  H. B. MUELLER  2,243,915
HAND TRUCK
Filed Aug. 10, 1938   2 Sheets-Sheet 1
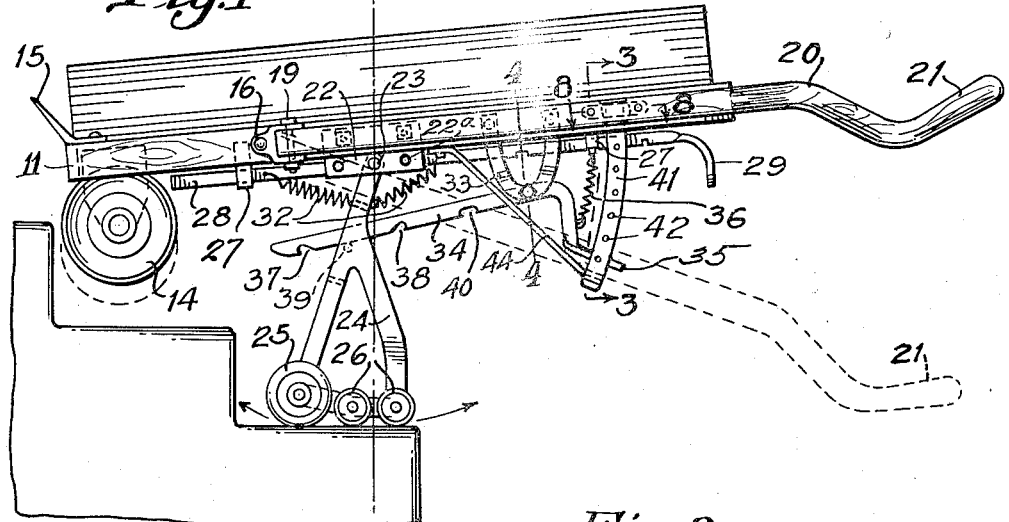
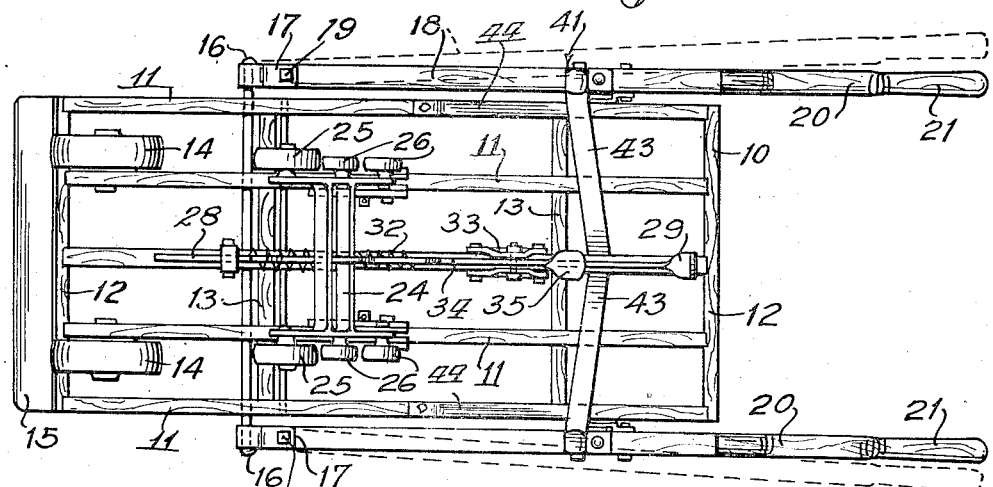
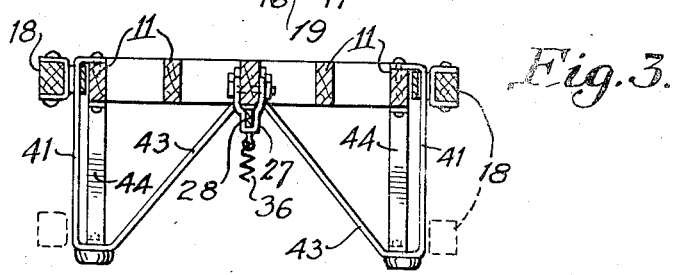
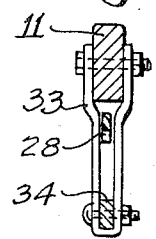
INVENTOR.
HERBERT B. MUELLER
BY
ATTORNEY.

June 3, 1941.   H. B. MUELLER   2,243,915
HAND TRUCK
Filed Aug. 10, 1938   2 Sheets-Sheet 2
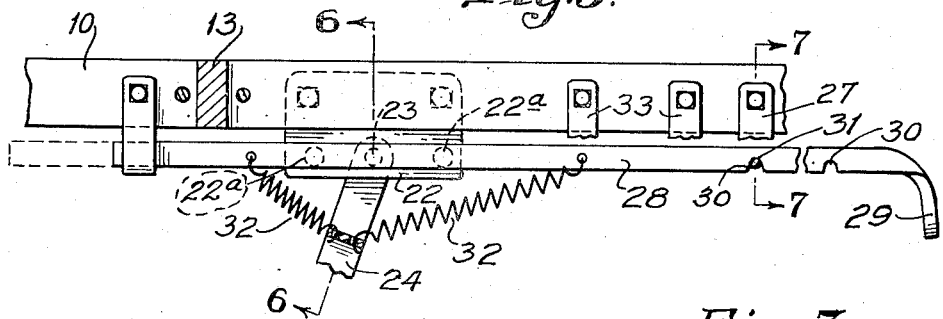
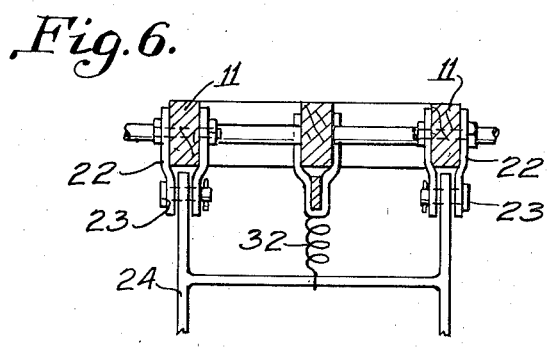
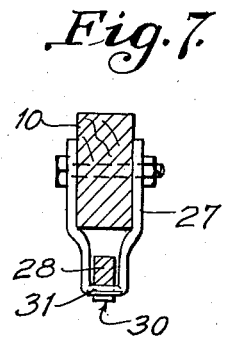
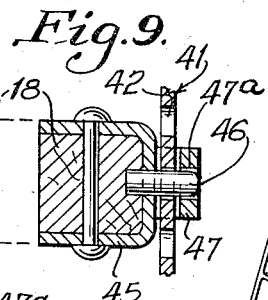
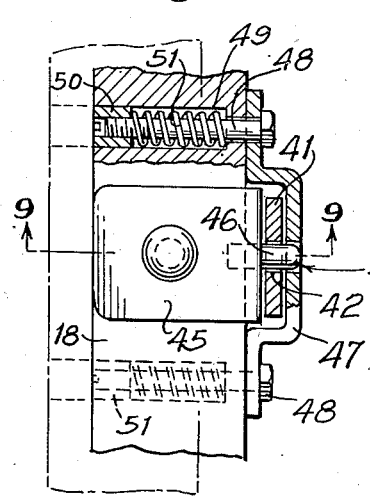
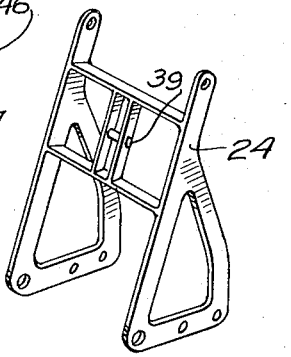
INVENTOR.
HERBERT B. MUELLER
BY Martin P. Smith
ATTORNEY.

Patented June 3, 1941

2,243,915

UNITED STATES PATENT OFFICE 2,243,915

HAND TRUCK

Herbert B. Mueller, Los Angeles, Calif.

Application August 10, 1938, Serial No. 224,081

19 Claims. (Cl. 280—54)

My invention relates to a hand truck and has for its principal object the provision of a relatively simple, practical and inexpensive truck that is constructed so that when manipulated it may be readily and conveniently moved up or down stairs, thereby enabling heavy or bulky objects to be readily moved from one floor to another.

A further object of my invention is, to provide a truck-barrow having its forward end supported by wheels and with a frame suspended for swinging movement beneath the intermediate portion of the frame of the truck or barrow, which swinging frame carries at its lower end wheels that are adapted to engage the ground or surface upon which the truck is being moved, said swinging frame and wheels constituting a rolling support for the truck-barrow and enabling the same to be tilted on a fulcrum that is coincident with the point of pivotal connection between the swinging frame and the body of the truck, which action greatly facilitates the manipulation of the truck while the same is being moved up or down stairs, or while wheeling heavy loads over level surfaces.

A further object of my invention is, to provide a hand truck of the character referred to with handles that are pivotally connected to the forward portion of the body of the truck in order that they may be adjusted vertically so as to operate the truck to the greatest advantage under different conditions and further, to construct the rear ends of the handles so that the same may be conveniently gripped by the operator while said handles are in different angular positions and particularly while the truck is being moved up or down stairs.

A further object of my invention is, to provide simple and efficient means whereby the wheel-carrying frame that is hinged to the intermediate portion of the truck body may be caused to swing in either direction so as to increase or decrease the wheel base of the truck to enable the same to be conveniently moved up or down stairs step by step and the truck including means for engaging and holding the swinging wheel-carrying frame in different positions as required for use.

This application is a continuation-in-part of my co-pending application on hand truck, filed August 23, 1937, Serial No. 160,452.

With the foregoing and other objects in view, my invention consists in certain novel features of construction and arrangement of parts that will be hereinafter more fully described and claimed and illustrated in the accompanying drawings in which:

Fig. 1 is a side elevational view of a hand truck constructed in accordance with my invention and showing the same in use for carrying a load up stairs.

Fig. 2 is a view looking against the underside of the truck.

Fig. 3 is a cross section taken on the line 3—3 of Fig. 1.

Fig. 4 is a cross section taken on the line 4—4 of Fig. 1.

Fig. 5 is a detail view of the manually operable sliding rail and springs that are utilized for swinging the wheel supported frame that depends from the intermediate portion of the truck frame, from one position to another.

Fig. 6 is a cross section taken on the line 6—6 of Fig. 5.

Fig. 7 is a cross section taken on the line 7—7 of Fig. 5.

Fig. 8 is an enlarged horizontal section taken approximately on the line 8—8 of Fig. 1.

Fig. 9 is a cross section taken on the line 9—9 of Fig. 8.

Fig. 10 is a perspective view of the swinging wheel-carrying frame that depends from the intermediate portion of the truck frame.

Referring by numerals to the accompanying drawings which illustrate a preferred embodiment of my invention, 10 designates a substantially rectangular skeleton frame that includes longitudinally disposed parallel rails 11, end rails 12 and intermediate cross rails 13. The forward end of this frame is supported by wheels 14 and secured on top of the forward end of the frame is an upwardly and forwardly projecting plate 15 that functions when the truck is used for picking up heavy and cumbersome objects.

Passing through the longitudinal rails 11 of the frame a short distance rearwardly from the wheels 14 is a rod 16, the ends thereof projecting beyond the sides of the frame and journalled on the projecting ends of this rod are yokes 17, to which are pivotally connected the forward ends of handles 18, the latter lying alongside the intermediate and rear portions of the frame. The pins or bolts 19 that pivotally connect the forward ends of these handles to the yokes 17 are vertically disposed so that the handles may swing outwardly from and toward the frame 10.

The rear end portions of the handles 18 are extended downward as designated by 20 in order to form inclined portions, which when the handles lie alongside the frame 10 and while the truck is being moved over a substantially level surface, occupy practically horizontal positions so as to be conveniently engaged by the hands of the operator.

The terminal portions of the handles beyond the inclined portions 20 are extended upwardly as designated by 21 in order that they may be conveniently gripped by the hands of the operator when the handles have been swung downwardly with respect to the truck frame and which condition exists when the truck is being moved up stairs.

The construction of the rear portions of the handles as just described enables said handles to be conveniently grasped by the hands of the operator during operation of the truck on comparatively level surfaces, as well as while ascending or descending stairs.

Secured to and depending from the longitudinal members 11 next adjacent the side rails of frame 10 are plates 22 provided in their lower portions with apertures 22a that are adapted to receive pins 23 and which latter pass through the upper end portions of a skeleton frame 24. By providing a plurality of apertures 22a, the upper end of frame 24 may be pivotally connected to the main frame of the truck in differently adjusted longitudinal positions.

Mounted for operation on the front lower end of said frame is a pair of wheels 25 and mounted for operation on said frame 24, immediately to the rear of the wheels 25, are two pairs of wheels 26 that are lightly smaller in diameter than the front wheels 25. Thus the frame 24 and the wheels 25 and 26 constitute a swinging rolling support for the truck frame and the pins or bolts 23 that connect the swinging frame to the truck frame constitute a fulcrum on which the truck frame and its load may be swung vertically during the operation of the truck and particularly while ascending and descending stairs.

Depending from the central one of the longitudinal rails 11 of the truck frame are substantially U-shaped clips 27 and arranged for longitudinal sliding movement therein is a bar 28, the rear end of which is bent downwardly to form a handle 29. Formed in the under side of the rear portion of sliding bar 28 are notches 30 which, when the bar is drawn to its limit of movement in either direction, engage the cross member 31 at the lower end of the rear one of the clips 27 and to disengage the bar from this cross member, it is only necessary to engage handle 29 and move the same and the rear portion of the bar upwardly a short distance.

Suitably connected to the upper portion of swinging frame 24 are the inner ends of retractile coil springs 32 which extend forwardly and rearwardly from said frame and the outer ends of these springs are connected to sliding bar 28. The length of these springs is such that when the bar 28 is drawn rearwardly to its limit of movement, the rear one of the springs 32 is expanded and the forward one of said springs is contracted and such conditions are reversed when the bar 28 is moved to its forward limit of movement.

Depending from the central one of the rails 11 of the truck frame, is a bracket 33 to the lower end of which is pivotally connected the rear portion of a longitudinally disposed bar 34, the rear end of which is bent downwardly and thence rearwardly to form a pedal 35 that is adapted to be engaged by the foot of the operator of the truck, so as to swing said bar upon its axis.

Connected to the depending rear end 35 of bar 34 is the lower end of a retractile spring 36, the upper end of which is connected to one of the clips 27 that provides supports for sliding bar 28. This spring normally swings the forward portion of bar 34 downwardly.

Bar 34 extends forwardly through the upper portion of frame 24 and formed in the under side of the forward portion of said bar are oppositely arranged notches 37 and 38 that are adapted to receive a transverse pin 39 that is seated in the upper central portion of swinging frame 24.

As a result of the arrangement just described, the frame 24 will be held at its forward limit of movement by the engagement of pin 39 in the forward notch 37 and when frame 24 is swung rearwardly beyond the vertical plane occupied by the axis provided by bolts 23, the frame will be held in such position by the engagement of pin 39 in notch 38.

Formed in the under side of bar 34 a short distance to the rear of notch 38 is a notch 40 that receives pin 39 when the wheel-carrying frame 24 is swung rearwardly and upwardly into an out-of-the-way position when the truck is being used on comparatively level surfaces.

Secured to the side rails 11 of frame 10 a short distance rearwardly from the bracket 33 are the upper ends of depending straps 41 that are curved so that they are concentric with the axis formed by the transverse rod 16 and each of these depending straps are provided with a row of spaced perforations 42.

From the lower ends of these straps 41, braces 43 extend upwardly and the upper ends of said braces are secured to the intermediate one of rails 11 of frame 10.

To further brace the arcuate perforated straps 41, braces 44 extend from the lower end of said straps 41 upwardly and forwardly and the upper ends of said last mentioned braces are secured to the side rails 11 of frame 10.

Arcuate straps 41 are disposed between the side rails 11 of frame 10 and the handles 18 and secured to the handles 18 are U-shaped clips 45 and projecting therefrom outwardly form the handles or pins 46. These pins are adapted to pass through the apertures 42 in straps 41 and thereby hold the handles in differently adjusted positions below the frame 10.

Overlying the straps 41 are straps 47 and passing through the ends of said straps 47 are bolts 48 that extend through apertures 49 formed in the handles 18.

The threaded ends of the bolts 48 receive circular nuts 50 that are arranged for sliding movement in the apertures 49 and interposed between said nuts and the bottoms of the apertures 49 are expansive coil springs 51 that yieldingly resist the movement of the nuts 50 into the apertures as the handles are swung outwardly away from the sides of the truck body.

Formed through straps 47 are apertures 47a with which the apertures 42 are adapted to coincide as the handles are raised and lowered and said apertures 47a are adapted to receive the outer ends of the pins 46.

The operation of my improved hand truck is as follows:

While moving loads of comparatively light weight upon floors or other comparatively level surfaces, the handles 18 are positioned immediately adjacent the side rails of frame 10 with the pins 46 projecting through the uppermost apertures in the straps 41 and into the apertures 47a in the straps 47 and frame 24 is swung rearwardly to its limit of movement and held in such position before the engagement of pin 39 in the notch 40.

When moving the truck over a comparatively level surface, the wheels 14 provide a rolling support for the front end of the truck and the frame of said truck occupies an inclined position of approximately 30 or 35 degrees relative to the horizontal and when so positioned the portions 20 of the handle that are grasped by the operator's hands are practically horizontally disposed, so as to be conveniently and comfortably engaged by the hands.

While moving loads and particularly heavy loads upon floors or other comparatively level surfaces and in order to remove practically all of the weight of the load from the operator's hands and arms, the wheel-carrying frame 24 is permitted to swing downward into a rearwardly inclined position with the cross pin 39 engaging notch 38 and by swinging the truck frame on the fulcrum formed by the pins 23 that connect the swinging frame to the truck frame, the front portion of the truck frame may be swung upward until said truck frame assumes a practically level position and the truck and its load may now be, with little effort rolled forwardly or rearwardly over the floor or level surface with the wheels 25 functioning as a rolling support.

Such provision of moving the truck forwardly or rearwardly upon the centrally arranged wheel-carrying frame 24 enables the truck to be very conveniently handled, particularly while being moved in limited spaces, for instance, through narrow hallways or through a door disposed to either side of the forward line of travel of the truck.

The hinged wheel-carrying frame 24 constitutes a swinging wheeled support for the truck frame 10, as well as a fulcrum on which said truck frame may be swung during its manipulation and when frame 24 is swung upwardly and rearwardly to its limit of movement with pin 39 occupying notch 40, the wheels 25 provide a rolling support for the rear portion of the truck and its load.

When the frame 24 and its wheels are utilized as a rolling support, the truck body may be conveniently tilted on the fulcrum provided by the bolts 23.

To move the loaded truck up stairs the forward end of the truck is moved into position against the first riser, and the truck body is now swung on the fulcrum formed by the bolts 23 so as to elevate the forward end of the truck to a position where the wheels 14 may be disposed in a plane above the second tread surface of the stairs. The truck is now moved forward until the wheels 14 engage against the riser to the rear of the tread surface on which they are positioned and such movement brings the wheels 25 on the lower forward portion of frame 24 against the first riser. The operator now lifts the rear end of the truck frame until the wheels 25 and 26 are positioned above the first tread surface and when so positioned the frame 24 will swing forward under the influence of the expanded forward one of the springs 32, so as to position the wheels 25 and 26 on the first tread surface. Prior to the operation just described, the operator engages handle 29 of bar 28 and moves the same forwardly until the rear one of the notches 30 engage pin 31 and this operation expands the forward one of the springs 32 and contracts the rear one of said springs, thus tending to normally swing frame 24 forwardly.

The rear end of the truck is now swung downward with the pins 23 serving as a fulcrum and when the wheels 14 have been elevated above the next tread surface the entire truck is moved forward, during which movement the wheels 25 and 26 provide a rolling support for the truck and its load. The forward end of the truck is now permitted to lower until the wheels 14 rest on the tread surface above which they are positioned and the operator continues such operations to move the load to the top of the stairs.

During this operation, the frame 24 constitutes a swinging rolling support for the truck and its load and when the wheels at the lower end of said swinging frame are resting on one of the tread surfaces with the wheels 25 in front of a vertical plane passing through the fulcrum formed by the pins 23, the operator can move the truck frame forwardly with the wheels 25 providing an axis of movement for the frame 24 and the truck frame and, such movement causes the fulcrum formed by the pins 23 to pass forwardly of the vertical plane occupied by the axis of wheels 25 and immediately thereafter the weight of the load on the truck functions to continue the forward movement of the truck and which action enables the truck and its load to be moved up stairs with comparatively little effort on the part of the operator.

The movements just described are repeated until the loaded truck reaches the top of the stairs.

In thus moving the truck up stairs, the operator in order to facilitate the operation of the truck, may swing the handles 18 downwardly into the position shown by dotted lines in Fig. 1. This movement may be accomplished by first swinging the rear portions of the handles outwardly away from the sides of the truck a sufficient distance to disengage the pins 46 from the apertures 42 and 47, which movement is permitted by the bolts 48 and nuts 50 which have sliding engagement with the handles 18 and after the pins are disengaged from the apertures 42 and 47a, the handles may be moved downward into the desired inclined positions and then said handles are permitted to move inward under the influence of the expansion springs 51 to position pins 46 in certain of the apertures 42 in the straps 41.

To move the loaded truck down stairs, bar 28 is drawn rearwardly to its limit of movement to expand and store pressure in the rear one of springs 32 and contract the forward one of said springs and under such conditions the expanded spring will act to swing the wheel-carrying frame 24 rearwardly and upwardly. After the front wheels 14 of the truck have been positioned on the tread surface of the upper step, the rear end of the truck frame is lifted by upward pull on the handles 18 and under such conditions the rear one of springs 32 will act to swing frame 24 rearwardly, so as to position the wheels 25 and 26 above the second one of the tread surfaces of the steps below the tread surface on which the wheels 14 rest and the operator now pulls the truck rearwardly a short distance until the wheels 14 clear the tread surface on which they have been positioned and the forward end of the truck may now be lowered until the wheels 14 rest on the next adjacent lower tread surface.

In moving the truck down stairs, the six wheels 25 and 26 provide a rolling support on each tread surface of the stairs and when the large pair of wheels 25 have been moved to a position adjacent the upper end of the riser just below the tread surface on which the wheels rest, the small wheels 26 will be positioned entirely clear of the tread surface on which the wheels 25 rest and, under such conditions the frame 24 serves as a support on which the truck frame may be tilted and at the same time the wheels 25 provide an axis on which the frame 24 may be swung backwardly or forwardly in the manipulation of the truck to lower the wheels 14 from one tread surface to the next and to handle the load with minimum effort on the part of the operator.

Thus it will be seen that I have provided a stair-climbing truck or barrow that is relatively simple in construction, inexpensive of manufacture and very effective in performing the functions for which it is intended.

When the swinging frame 24 occupies a slightly inclined rearward position with the large wheels 25 only resting upon the floor or ground, the truck may be turned completely around in a space equal to its length and when the frame occupies a substantially vertical position, with all wheels 25 and 26 resting upon the floor or ground, a rolling support of substantial length is provided for the truck.

The truck may be conveniently manipulated and easily turned in limited spaces and the swinging frame that depends from the intermediate portion of the truck body and which is provided with wheels on its lower portion constitutes a rolling support for the intermediate portion of the truck and the upper end of said rolling support constituting a fulcrum on which the truck body swings during service.

An especially desirable feature of my invention is the handles that are disposed to the sides of the truck frame and which are pivotally connected at their forward ends to said frame, so that said handles may be moved downward with respect to the rear portion of the frame and maintained in such position so that the loaded truck may be advantageously handled, particularly while being moved up or down stairs.

A further desirable feature of my invention is the position of the inclined portions at the rear ends of the handles which enables the handles to be conveniently and comfortably grasped by the hands regardless of the inclined position of the truck body.

It will be understood that minor changes in the size, form and construction of the various parts of my improved hand truck, may be made and substituted for those herein shown and described, without departing from the spirit of my invention, the scope of which is set forth in the appended claims.

I claim as my invention:

1. In a hand truck, a body frame, wheels supporting the forward end of said frame, handles pivotally connected to the sides of said frame near the forward end thereof so as to swing outwardly and downwardly with respect to said frame, means for holding said handles in differently adjusted positions below the rear portion of said frame, a frame hinged to and depending from the intermediate portion of the body frame and a plurality of pairs of wheels journalled for rotation on transverse axes on the lower portion of said hinged frame.

2. A hand truck as set forth in claim 1, with retractile springs connected to the upper portion of the hinged frame and extending in opposite directions therefrom and means connected to the outer ends of said springs and mounted for sliding movement on the body frame for stretching said springs to store power therein.

3. A hand truck as set forth in claim 1 and with means mounted for operation on the under side of the body frame for engaging and holding the hinged frame in different positions.

4. In a hand truck, a body frame, wheels journalled beneath the forward end of said body frame and providing a rolling support for said forward end, handles on the sides of said body frame and projecting beyond the rear end thereof, a frame hinged to and depending from the intermediate portion of said body frame, wheels journalled in the lower front portion of said hinged frame, smaller wheels journalled in the lower rear portion of said hinged frame, retractile springs connected to and extending in opposite directions from the upper portion of said hinged frame and a bar to which the outer ends of said springs are connected, which bar is arranged for longitudinal sliding movement between the body frame.

5. In a hand truck, a body frame, wheels journalled beneath the forward end of said body frame and providing a rolling support for said forward end, handles on the sides of said body frame and projecting beyond the rear end thereof, a frame hinged to and depending from the intermediate portion of said body frame, wheels journalled in the lower front portion of said hinged frame, smaller wheels journalled in the lower rear portion of said hinged frame, retractile springs connected to and extending in opposite directions from the upper portion of said hinged frame, a bar to which the outer ends of said springs are connected, which bar is arranged for longitudinal sliding movement beneath the body frame and means for engaging and holding the hinged frame in different positions beneath the body frame.

6. In a hand truck, a wheel supported frame, handles connected to the sides of said frame so as to move laterally and vertically relative to said frame and the rear portion of each handle having a downwardly inclined portion and an upwardly inclined portion.

7. A hand truck as set forth in claim 6, with readily releasable means for connecting the intermediate portions of said handles to the sides of said frame.

8. A hand truck as set forth in claim 6, with means for securing the handles in differently adjusted inclined positions relative to the truck frame, a frame hinged to the intermediate portion of the truck frame and depending therefrom, yielding means for normally maintaining the depending frame in an intermediate position and a plurality of pairs of wheels journalled on horizontal axes on the lower portion of said hinged frame.

9. The combination with a hand truck having wheels journalled for rotation beneath its forward end to provide a rolling support for the forward portion of said truck and handles at its rear end, of a frame hinged to and depending from the intermediate portion of the frame of said hand truck, a plurality of pairs of wheels journalled on horizontal axes on the lower portion of said hinged frame, with one pair of wheels disposed in front of the other and selective means including retractile springs arranged between the frame of the hand truck and on opposite sides of said wheel-carrying frame for causing the latter to tend to swing either forwardly or rearwardly to a position where no movement of the wheel-carrying frame is possible unless some external force is applied thereto to destroy the equilibrium set up by said springs.

10. In a hand truck, a body, wheels supporting the forward end of said body, handles on the rear end of said body, a frame hinged to and depending from the intermediate portion of said body, wheels on the lower end of said frame, springs connected to the upper portion of the frame and extending in opposite directions therefrom and means connected to the outer ends of said springs and mounted for sliding movement on said frame for stretching said springs to store power therein.

11. In a hand truck, a body, wheels supporting the forward end of said body, handles on the rear end of said body, a frame hinged to and depending from the intermediate portion of said body, wheels on the lower end of said frame, springs connected to the upper portion of the frame and extending in opposite directions therefrom, means connected to the outer ends of said springs and mounted for sliding movement on said frame for stretching said springs to store power therein and means mounted on the under side of the frame for holding the swinging frame in different positions.

12. In a hand truck, a body, wheels supporting the forward end of said body, handles projecting from the lower end of said body, a frame hinged to and depending from the intermediate portion of said body, wheels carried by the lower end of said frame, means associated with said frame and the truck body for causing said frame to swing in one direction or the other to increase or decrease the wheel base of the truck as the wheels carried by the swinging frame are lifted from a supporting surface and manually operable spring held means for automatically engaging said swinging frame to hold the same in different positions.

13. In a hand truck, a body, wheels supporting the forward end thereof, handles on the rear end of said body, a swinging frame having its upper end adjustably connected to the intermediate portion of said body, wheels carried by the lower end of said swinging frame, springs connected to opposite sides of said swinging frame for causing the same to swing lengthwise of the truck and thereby vary the wheel base thereof, manually operable means for simultaneously stretching one of said springs to store power therein and to permit the other spring to contract and automatically operating spring pressed means for engaging and holding said swinging frame in various positions.

14. In a hand truck, a body, a wheel supporting the forward end thereof, handles on the rear end of said body, a swinging frame having its upper end adjustably connected to the intermediate portion of said body, wheels carried by the lower end of said swinging frame, springs connected to opposite sides of said swinging frame for causing the same to swing lengthwise of the truck and thereby vary the wheel base thereof, manually operable means for simultaneously stretching one of said springs to store power therein and to permit the other spring to contract, automatically acting spring pressed means for engaging and holding said swinging frame in various positions and means for limiting the forward swinging movement of said wheel-carrying frame.

15. In a hand truck, a body, a wheel supporting the forward portion of said body, handles projecting from the rear end of said body, a frame depending from the intermediate portion of said body, means for pivotally connecting said depending frame to the body at different points longitudinally thereof, wheels carried by the lower end of said frame, springs connected to opposite sides of said frame, a member mounted for sliding movement on the under side of the truck body for simultaneously stretching one of said springs and contracting the other, said sliding member being provided with oppositely arranged notches and a fixed member adapted to be received by either one of said notches.

16. In a hand truck, a body, a wheel supporting the forward portion of said body, handles projecting from the rear end of said body, a frame depending from the intermediate portion of said body, means for pivotally connecting said depending frame to the body at different points longitudinally thereof, wheels carried by the lower end of said frame, springs connected to opposite sides of said frame, a member mounted for sliding movement on the under side of the truck body for simultaneously stretching one of said springs and contracting the other and manually operable spring held means for engaging and holding the swinging frame in various positions.

17. In a hand truck, a body, a wheel supporting the forward portion of said body, handles projecting from the rear end of said body, a frame depending from the intermediate portion of said body, means for pivotally connecting said depending frame to the body at different points longitudinally thereof, wheels carried by the lower end of said frame, springs connected to opposite sides of said frame and extending in opposite directions therefrom and manually operable means to which the outer ends of said springs are connected for simultaneously stretching one spring and contracting the other spring.

18. In a hand truck, a body, a wheel supporting the forward portion of said body, handles projecting from the rear end of said body, a frame depending from the intermediate portion of said body, means for pivotally connecting said depending frame to the body at different points longitudinally thereof, wheels carried by the lower end of said frame, springs connected to opposite sides of said frame and extending in opposite directions therefrom, manually operable means to which the outer ends of said springs are connected for simultaneously stretching one spring and contracting the other spring and means for engaging and holding the swinging frame in various positions.

19. In a hand truck, a frame, a wheel supporting the forward portion of said frame, a pair of wheels mounted beneath the intermediate portion of said frame so as to move toward and away from the forward wheel and thereby increase or diminish the wheel base of the truck as the same is moved up and down steps, retractile springs connected to and arranged on opposite sides of said movable wheels and a member arranged for longitudinal sliding movement on the under side of the truck to which the outer ends of said springs are connected.

HERBERT B. MUELLER.